(12) United States Patent
Hawkins et al.

(10) Patent No.: US 12,291,293 B2
(45) Date of Patent: May 6, 2025

(54) CARAVAN MOVER SYSTEM

(71) Applicant: PURPLE LINE LIMITED, Ipswich (GB)

(72) Inventors: Ben Hawkins, Ipswich (GB); Jonathan Harrison, Ipswich (GB); Yuxian Tao, Aberdeen (GB)

(73) Assignee: Purple Line Limited (GB)

( * ) Notice: Subject to any disclaimer, the term of this patent is extended or adjusted under 35 U.S.C. 154(b) by 507 days.

(21) Appl. No.: 17/431,420

(22) PCT Filed: Feb. 19, 2020

(86) PCT No.: PCT/GB2020/050399
§ 371 (c)(1),
(2) Date: Aug. 16, 2021

(87) PCT Pub. No.: WO2020/169972
PCT Pub. Date: Aug. 27, 2020

(65) Prior Publication Data
US 2022/0081047 A1     Mar. 17, 2022

(30) Foreign Application Priority Data

Feb. 19, 2019    (GB) ..................................... 1902281

(51) Int. Cl.
*B60D 1/00*     (2006.01)
*B60K 1/02*     (2006.01)
(Continued)

(52) U.S. Cl.
CPC ................ *B62D 59/04* (2013.01); *B60K 1/02* (2013.01); *B60K 7/0007* (2013.01); *B62D 11/04* (2013.01); *G05D 1/0016* (2013.01)

(58) Field of Classification Search
CPC ...... B62D 59/04; B62D 11/04; G05D 1/0016; B60K 7/0007; B60K 1/02
See application file for complete search history.

(56) References Cited

U.S. PATENT DOCUMENTS 8,333,257 B2 * 12/2012 Bonnardel ............. B62D 59/02
                                                        180/19.1
9,896,067 B2 *  2/2018 Okerlund ............... B60D 1/665
(Continued)

FOREIGN PATENT DOCUMENTS

CN    205365801 U    7/2016
CN    107776704 A    3/2018
(Continued)

OTHER PUBLICATIONS

International Search Report and Written Opinion of PCT/GB2020/050399, 13 pages, Marc Peeters, Jun. 4, 2020.
(Continued)

*Primary Examiner* — Dalena Tran
(74) *Attorney, Agent, or Firm* — Dicke, Billig & Czaja, PLLC

(57) ABSTRACT

The present invention relates to an adjustable control system for a caravan moving system in which the caravan movers each include a brushed motor. The adjustable control system can control two caravan movers (10) mounted on a single axle caravan or two caravan movers mounted on a twin axle caravan or four caravan movers mounted on a twin axle caravan (quad system). The caravan moving system comprises a control unit, a user operated actuating device, power means and a drive unit. The present invention utilises a control system which provides variable movement of the or each caravan mover (10) and also provides gradual changes in both speed of each brushed motor and the subsequent ability to smoothly change the direction of travel of the caravan. In particular, the present invention enables the caravan to follow a wavy or curved line of travel in which the radius of the turn varies (i.e. from 0 degrees to a spin on the spot (equivalent to a 90 degree turn)). Accordingly, the caravan can follow sinusoidal and/or elliptical lines of travel without intermittent stops to provide sequential directional (Continued)

changes. Furthermore, the user has the continuous ability to simultaneously vary the speed.

19 Claims, 7 Drawing Sheets

(51) Int. Cl.
  *B60K 7/00*    (2006.01)
  *B62D 11/04*   (2006.01)
  *B62D 59/04*   (2006.01)
  *G05D 1/00*    (2006.01)

(56) References Cited

U.S. PATENT DOCUMENTS

| | | | |
|---|---|---|---|
| 10,160,424 B2 * | 12/2018 | Roberts | B60S 9/04 |
| 10,988,163 B2 * | 4/2021 | Jiang | B66F 9/07572 |
| 2014/0114521 A1 | 4/2014 | Aemisegger et al. | |
| 2016/0347408 A1 | 12/2016 | Guida | |

FOREIGN PATENT DOCUMENTS

| | | |
|---|---|---|
| DE | 202009005524 U1 | 7/2009 |
| DE | 102010062979 A1 | 6/2012 |
| DE | 202012006089 U1 | 9/2012 |
| DE | 102012010540 A1 | 12/2013 |
| DE | 102012016234 A1 | 2/2014 |
| EP | 08279898 A1 | 3/1998 |
| EP | 1225090 A2 | 1/2002 |
| EP | 1679251 A2 | 7/2006 |
| EP | 1826107 A2 | 8/2007 |
| EP | 1894822 A1 | 3/2008 |
| EP | 2028086 A1 | 2/2009 |
| EP | 2138387 B1 | 12/2009 |
| EP | 2669124 A1 | 12/2013 |
| EP | 2669153 A1 | 12/2013 |
| EP | 3927605 B1 | 11/2023 |
| GB | 2371278 A | 7/2002 |
| GB | 2435455 A | 8/2007 |
| GB | 2525406 A | 10/2015 |
| GB | 2582894 A | 10/2020 |
| SU | 935332 A2 | 6/1982 |
| WO | 2020169972 A1 | 8/2020 |

OTHER PUBLICATIONS

UKIPO Search Report of GB1092281.3, 4 pages, Simon Rose, Oct. 25, 2019.

* cited by examiner

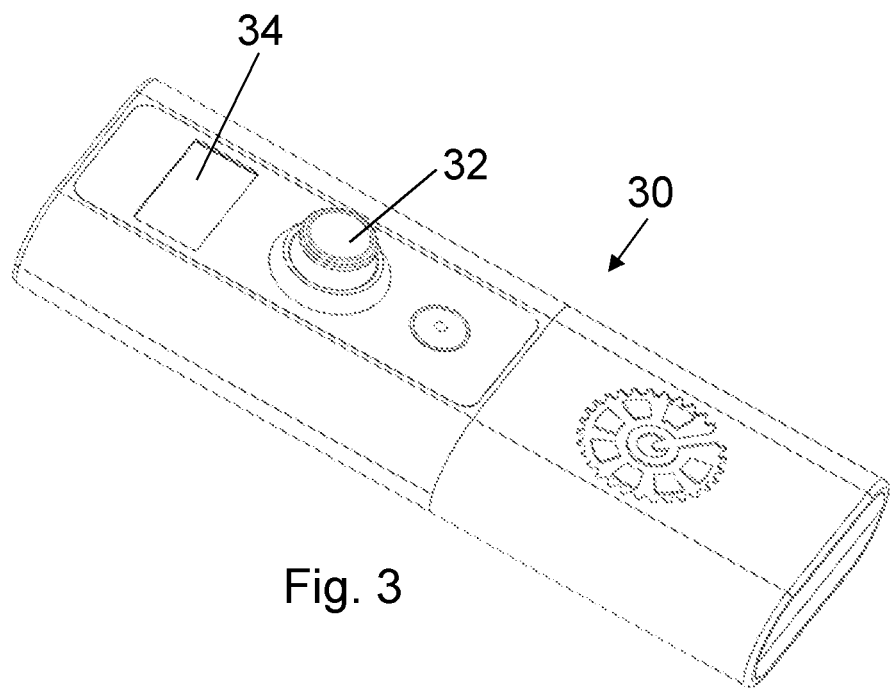
Fig. 3
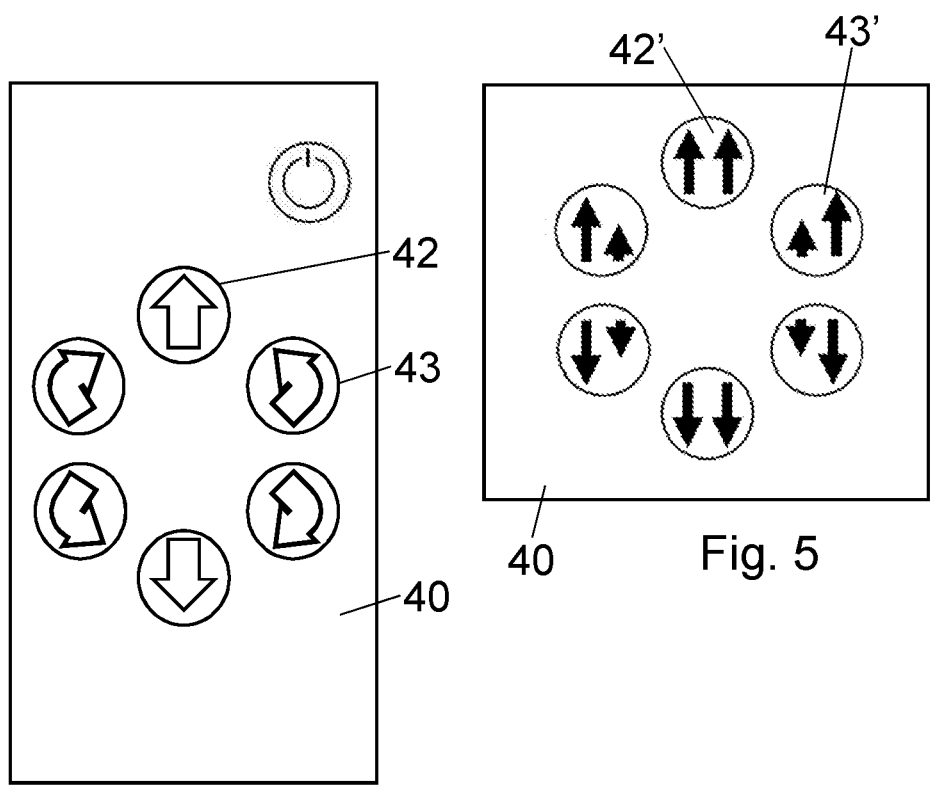
Fig. 4
Fig. 5

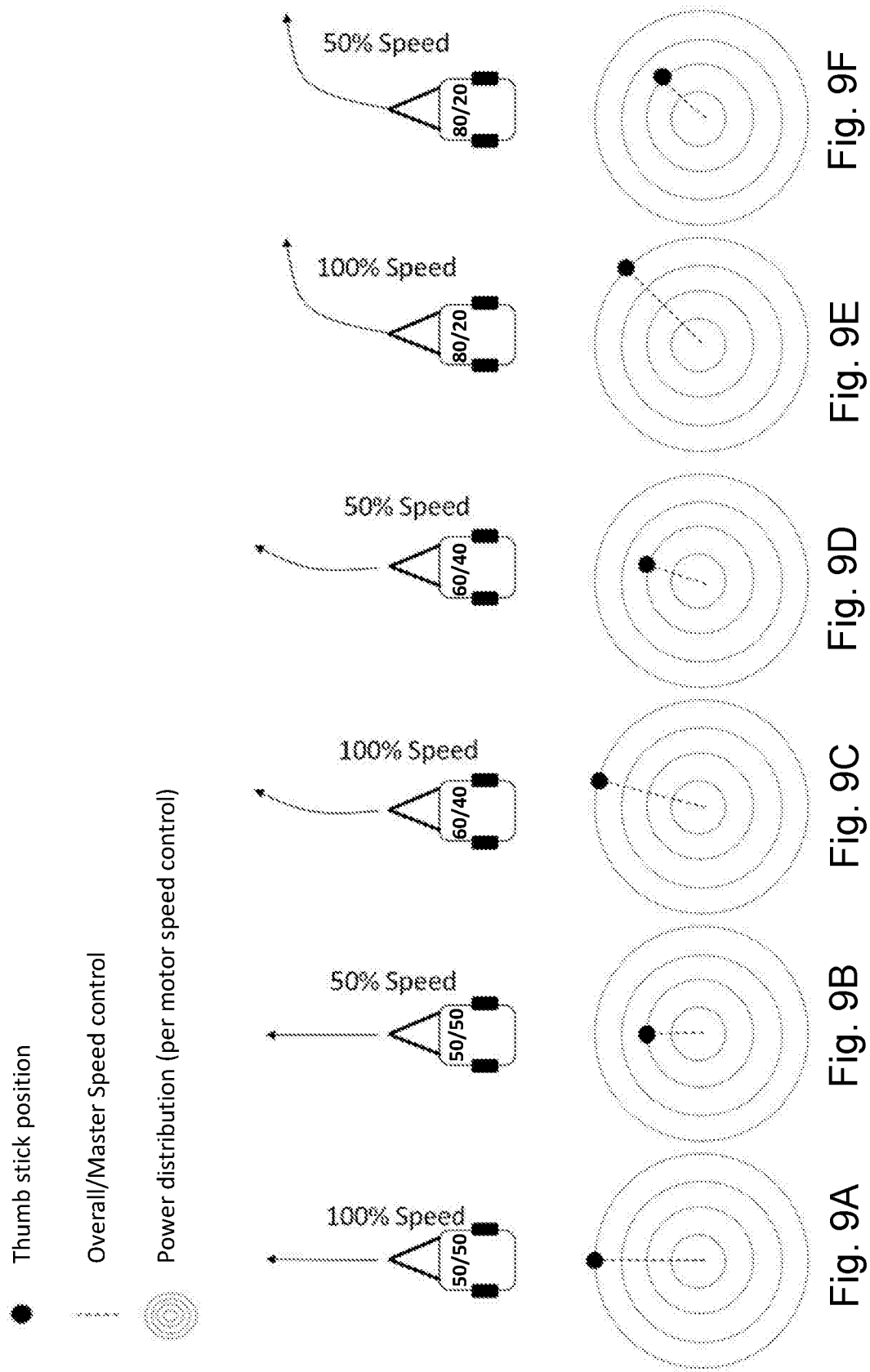

CARAVAN MOVER SYSTEM

FIELD OF THE INVENTION

The present invention relates to a caravan mover system, a caravan mover incorporating a control system and a method of controlling a caravan mover system.

BACKGROUND TO THE INVENTION

Trailers are unpowered vehicles which are designed to be coupled to and then moved by a powered vehicle, for example a car, van etc. Such trailers include caravans. Generally, caravans are towed to a suitable site by a car. Once at a site, the caravan is unhitched from the car and the caravan is moved onto a pitch. The driver can try to manoeuvre the caravan directly on to the pitch but this is frequently not possible due to the confined spaces etc. Caravans are unpowered but a person or group of people can manually push and/or pull the caravan to the pitch. Alternatively, a drive system such as a caravan mover can be used to move the caravan on to the pitch.

A caravan mover generally comprises a motor which is controlled by a user. The caravan mover includes engagement means whereby a roller is selectively pressed against or removed from the outer tread of a wheel of the caravan. Typically, a caravan mover includes a drive roller which is urged into contact with the outer tread of a wheel of the caravan. A motor is arranged to rotate the drive roller which, through contact with the outer tread of the wheel, thereby rotates the wheel of the caravan. The caravan generally includes a caravan mover on one or two opposed wheels on an axle. Accordingly, through the selective movement of each caravan mover and the respective caravan wheels, the caravan can be arranged to independently move forwards or backwards and can be turned in either direction.

The caravan movers are generally controlled by a single control system in order for the user to have a single operating device to control the movement of each caravan mover provided on the caravan. For example, a caravan may have a single axle with two wheels with two caravan movers associated with each caravan wheel. These two caravan movers are then controlled by a control system which enables the user to control both caravan movers. In an alternative system, a caravan may have a twin or double axle with four wheels being independently driven by separate caravan movers. In this set up, a control system is required that enables the user to control the movement of the four caravan movers.

A caravan that is provided with a double axle having four wheels may be controlled by two caravan movers. Alternatively, the four wheeled caravan may have four caravan movers. Once the caravan movers have been installed, the required control system can then be installed in order to control the movement of the caravan.

It is an aim of the present invention to overcome at least one problem associated with the prior art and they are referred to herein or otherwise.

SUMMARY OF THE INVENTION

According to a first aspect of the present invention there is provided a control system for controlling a plurality of caravan movers mounted on a caravan wherein each caravan mover comprises:

drive means comprising a brushed motor; and a lateral roller wherein the lateral roller is arranged to move in an engagement direction between a first position and a second position and, in which, in the second position the lateral roller is arranged to be urged against a ground contacting surface of a wheel of the caravan in order to transmit the drive from the drive means to the wheel, and wherein the control unit is arranged to independently vary the speed of each brushed motor to enable a gradual change of speed of each brushed motor.

Preferably the control unit is arranged to independently vary the power distributed to each brushed motor from a power supply to enable a gradual change of speed of each brushed motor. Preferably the control system comprises a single control unit to control all of the caravan movers.

The control unit may comprise a speed compensation system whereby the power supplied to each caravan mover (brushed motor) changes in proportion to the load detected on the associated caravan mover (brushed motor).

The control unit provides an automatic adjustment feature to change the power supplied to each of the caravan movers (brushed motor) in response to a detection in a change in load experienced by the respective caravan mover(s) (brushed motor(s)).

The speed compensation system may control (vary) the power supplied independently to each caravan mover (brushed motor) in proportion to (as a function of) the load detected on the associated caravan mover (brushed motor).

The speed compensation system may control (vary/change) the power distributed to the motor(s) in proportion to the load detected on the associated motor(s) to achieve small speed variances in different load conditions at a particular set speed.

Preferably the control unit comprises feedback means to monitor load of the or each brushed motor. Preferably the feedback mean continuously monitors the load of the or each brushed motor.

Preferably the control unit is arranged to (automatically) change the power supplied to the brushed motor on detection of change of load on the brushed motor. Preferably the control unit is arranged to change the power supplied to the brushed motor on detection of change of load on the brushed motor to maintain a uniform/constant motor speed (in the absence of any change in the manual control).

Preferably the speed compensation system includes a mapping function which sets the power change in response to a given change in load.

The speed compensation system may comprise a switching device. The speed compensation system may comprise a high speed (semi-conductor) switching device. The speed compensation system may comprise a microprocessor.

The control system may comprise a single handset which simultaneously controls all of the caravan movers.

The remote handset may comprise a single joystick control which controls the speed of each of the caravan movers.

The remote handset may comprise a single thumb stick control which controls the speed of each of the caravan movers.

The remote handset may gradually change the direction of travel of the caravan by gradually varying the distribution of power to the brushed motors.

The remote handset comprises a single actuator which controls the distribution of power to each caravan mover to gradually vary an overall movement speed of the caravan and the proportional distribution also sets/controls (gradually varies) a direction of movement of the caravan.

The control system may comprise a remote handset. Preferably the remote handset comprises a single manually controlled device which enables a user to gradually vary the speed of each brushed motor and may vary the ration of power provide to a left side and a right side of the caravan.

The remote handset may be wirelessly connected to the control unit. The remote handset may be wirelessly connected to the control unit using Bluetooth.

The remote handset may comprise a joystick for independently controlling the speed of each brushed motor. The remote handset may comprise a thumb stick for independently controlling the speed of each brushed motor.

The remote handset may comprise a display screen. The display screen may provide a display to indicate the speed of each brushed motor. The display screen may provide a display to indicate the direction of travel of the caravan.

Preferably the remote handset provides a human machine interface.

The remote handset may comprise a mobile phone and may comprise a smartphone.

The single (sole) actuator may comprise an input device which is pivotally mounted to the remote handset. The actuator may comprise bias means (or urging means) to bias (urge) the actuator to a central (neutral) position which stops power distribution to the or each brushed motor and preferably sets a default position for stopping any movement of the caravan when the actuator is released by the user.

The actuator may enable the caravan to travel in an elliptical line of travel. The actuator may enable the caravan to travel in a curved line of travel in which the radius of curvature varies.

Preferably, in the first position, the roller of the respective caravan mover is arranged to be disengaged (and/or spaced from) the ground contacting surface of the wheel (so as to prevent the transmission of drive from the drive means (motor(s)) to the wheel).

The control unit may be arranged to brake each brushed motor independently to enable a gradual change of speed of each brushed motor.

The control unit may comprise a braking system arranged to automatically change the braking of each brushed motor on detection of change of load on the brushed motor to maintain a constant motor speed in the absence of any change in manual control.

Preferably the braking system comprises a regenerative braking system.

The braking system may provide a first braking mode, in which recovered energy may be used to brake a motor, and a second braking mode in which recovered energy may be returned to the power supply.

The braking system may be operable in the first braking mode and the second braking mode simultaneously, and the braking system may be arranged to vary the proportion of recovered energy used in the first braking mode and the second braking mode.

The braking system may be operable with the speed compensation mechanism to independently vary the speed of each brushed motor.

The power distributed to the motor(s) may change in proportion to the load detected on the associated motor(s) to achieve small speed variances in different load conditions at a particular set speed.

The caravan mover system may comprise two caravan movers. The caravan may comprise a single axle caravan.

The caravan mover system may comprise four caravan movers. The caravan may comprise a dual axle caravan.

Preferably each wheel of the caravan includes a caravan mover associated with it in order to move the respective wheel.

Preferably each caravan mover comprises a single (sole) brushed motor.

According to a second aspect of the present invention there is provided a caravan mover comprising:
  a control unit,
  drive means comprising a brushed motor, and
  a lateral roller wherein the lateral roller is arranged to move in an engagement direction between a first position and a second position and, in which, in the second position the lateral roller is arranged to be urged against a ground contacting surface of a wheel in order to transmit the drive from the drive means to the wheel,
  and wherein the control unit is arranged to vary the speed of the brushed motor and to enable a gradual change of speed of the brushed motor.

Preferably the caravan mover comprises power supply means. The control unit may be arranged to gradually change (increase and decrease) the power supplied to the brushed motor.

The control system may comprise a remote handset. Preferably the remote handset comprises a single manually controlled device which enables a user to gradually vary the speed of the brushed motor.

The remote handset may be wirelessly connected to the control unit.

The remote handset may comprise a joystick for controlling the speed of the brushed motor. The remote handset may comprise a thumb stick for controlling the speed of the brushed motor.

The remote handset may comprise a display screen. The display screen may provide a display to indicate the speed of the brushed motor.

The control unit may comprise a speed compensation system whereby the power supplied to the brushed motor changes in proportion to the load on the caravan mover.

Preferably the control unit comprises feedback means to monitor load of the brushed motor.

Preferably the control unit is arranged to change the power supplied to the brushed motor on detection of change of load on the brushed motor.

Preferably the speed compensation system includes a mapping function which sets the power change in response for a given change in load.

According to a third aspect of the present invention there is provided a method of controlling movement of a caravan comprising providing a control unit and a plurality of caravan movers secured to the caravan, wherein each caravan mover comprises:
  drive means comprising a brushed motor; and
  a lateral roller wherein the lateral roller is arranged to move in an engagement direction between a first position and a second position and, in which, in the second position the lateral roller is arranged to be urged against a ground contacting surface of a wheel of the caravan in order to transmit the drive from the drive means to the wheel,
  and wherein method comprises using the control unit to independently vary the speed of each brushed motor to enable a gradual change of speed of each brushed motor.

BRIEF DESCRIPTION OF THE DRAWINGS

The present invention will now be described, by way of example only, with reference to the drawings that follow, in which:

FIG. 3 is a perspective view of a preferred embodiment of a remote handset for a caravan mover system;

FIG. 4 is a schematic view of a prior art remote handset for a caravan mover system;

FIG. 5 is a schematic view of a prior art remote handset for a caravan mover system;

FIG. 9A to FIG. 9F are schematic representations showing the direction and speed of travel of a caravan and the relative position of a thumb stick of a preferred embodiment of a remote control.

DESCRIPTION OF THE PREFERRED EMBODIMENTS

The present invention relates to an adjustable control system for a caravan moving system. The adjustable control system can control two caravan movers 10 mounted on a single axle caravan or two caravan movers mounted on a twin axle caravan or four caravan movers mounted on a twin axle caravan (quad system). The caravan moving system comprises a control unit, a user operated actuating device, power means and a drive unit. In the specific preferred embodiment described below, the drive unit is provided in the form of a caravan mover.

Figure 1:
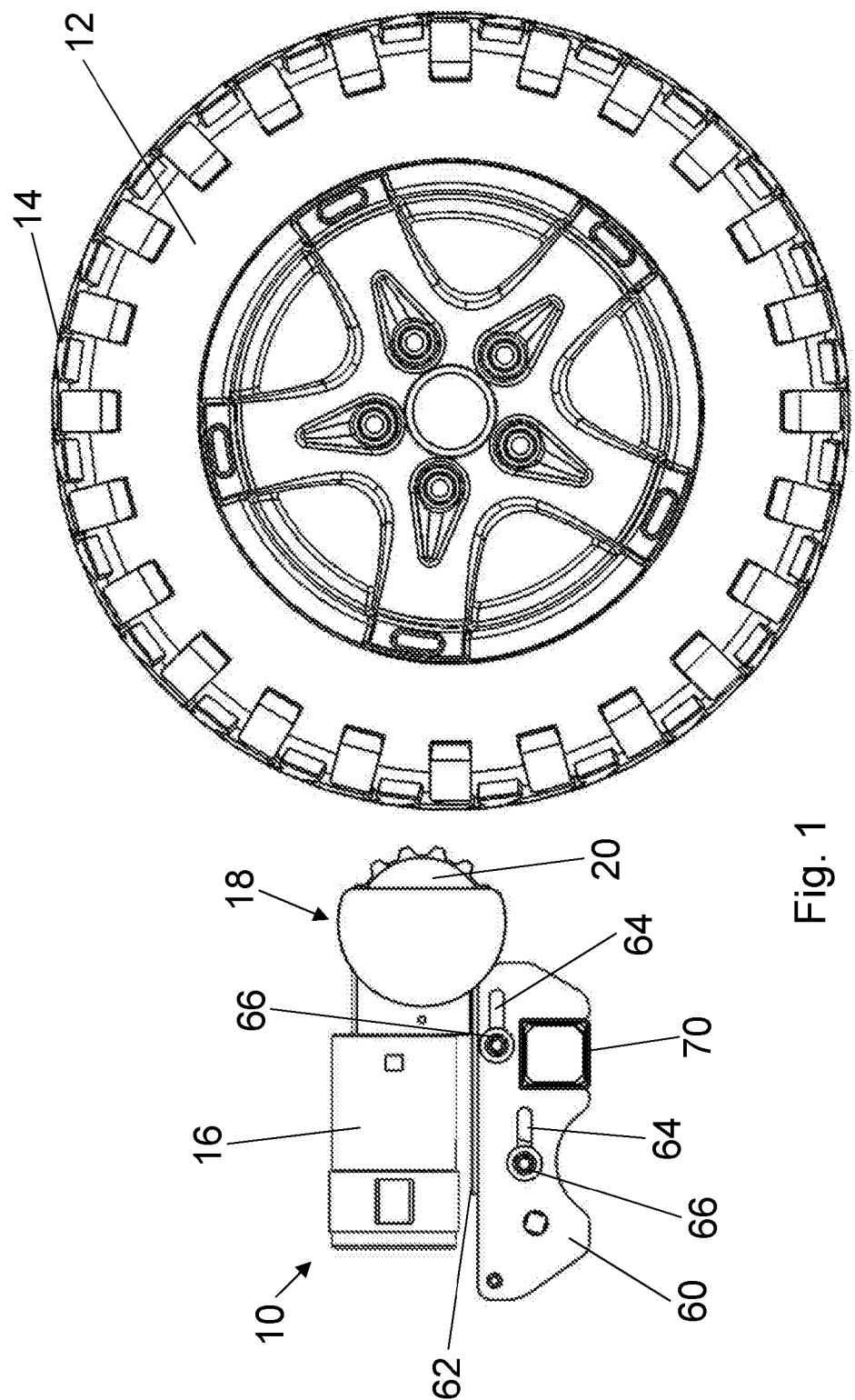
FIG. 1 is a side view of a preferred embodiment of a drive unit in a disengaged position relative to a wheel.
Figure 2:
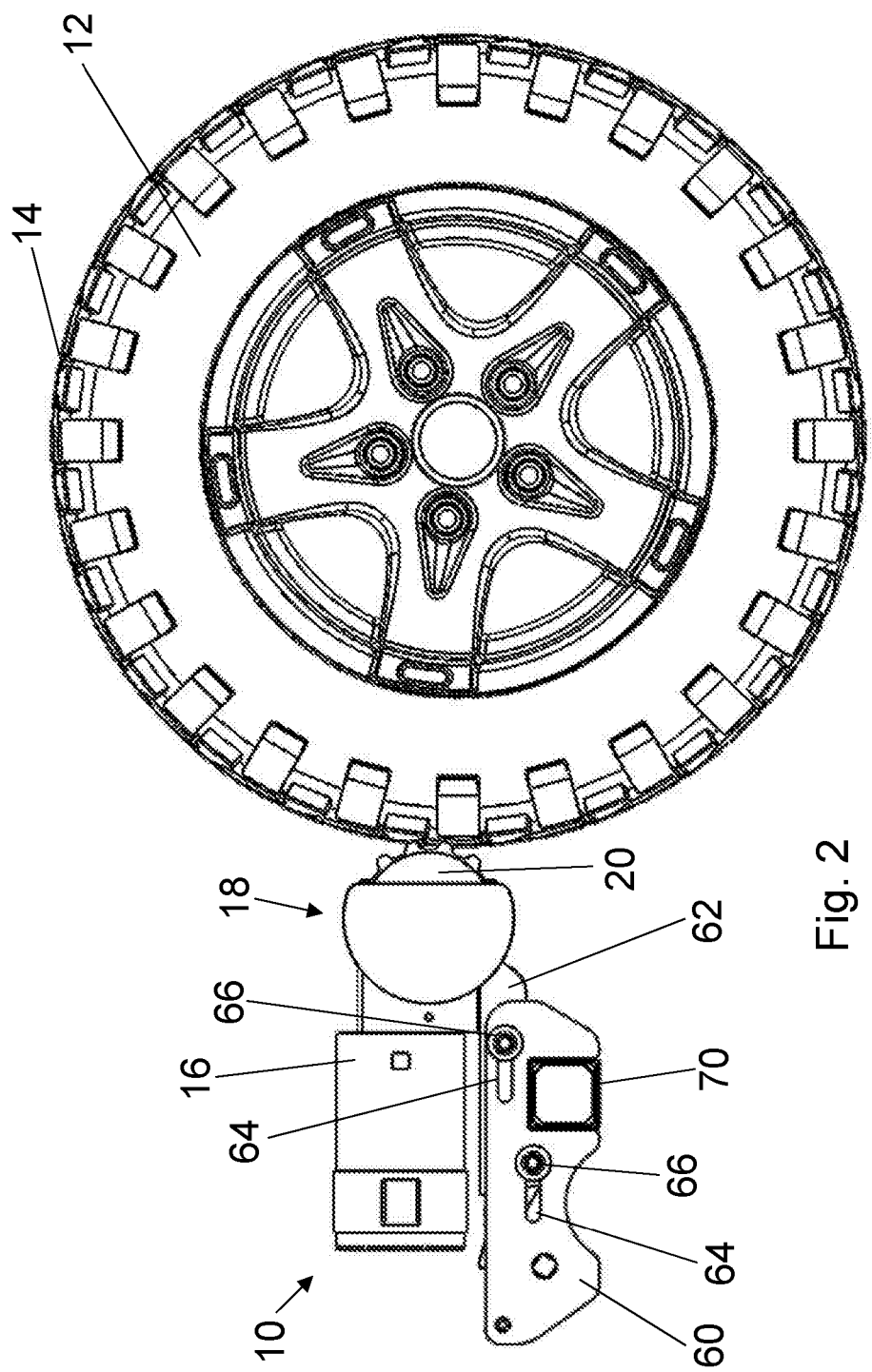
FIG. 2 is a side view of a preferred embodiment of a drive unit in an engaged position relative to a wheel.

As shown in FIG. 1 and FIG. 2, a trailer drive unit in the form of a caravan mover 10 comprises a motor 16 (drive means/drive device) and a head 18 housing a roller 20.

The caravan mover 10 is arranged to rotate a wheel of a caravan. In particular, a number of caravan movers 10 are provided in a caravan mover system to rotate the wheels of the caravan such that the caravan can be independently moved and positioned without having to manually move (push/pull) the caravan or to secure the caravan to a motorised towing vehicle. In a single axle caravan having two wheels, the caravan mover system includes a first (left) caravan mover 10 for a first (left) wheel and a second (right) caravan mover 10 for a second (right) wheel. In a dual/twin axle caravan each left side wheel may have an associated caravan mover 10 and each right side wheel may have an associated caravan mover 10. Accordingly, there may be four independent caravan movers 10. Alternatively, in some embodiments in a dual/twin axle caravan, there may a caravan mover 10 provided with just one wheel on each side such that only two independent caravan movers 10 are used.

Each caravan mover 10 thereby provides a roller 20 which is urged and pressed against a ground engaging surface (tread surface 14) of one of the wheels 12 of the caravan. The roller 20 is arranged to frictionally engage with the tread 14 of the tyre such that rotation of the roller 20 causes the caravan wheel 12 to rotate.

The roller 20 is provided with a frictional surface and this is further enhanced by the roller 20 having a raised pattern which may be generally sinusoidal or wavy. These peaks and troughs on the roller 20 help to efficiently transfer the rotation of the roller 20 to the wheel and to prevent slippage.

In use, at least the head 18 of the caravan mover 10 is arranged to be moved from a first position/disengaged position (as shown in FIG. 1) to a second position/engaged position (as shown in FIG. 2). The first position provides a disengaged position at which the surfaces of the roller 20 is spaced from the tread 14 of the wheel 12. The second position provides an engaged position at which the surface of the roller 20 is pressed against the tread 14 of the wheel 12. This movement is provided by an actuating system. The actuating system may comprise a manual system or may comprise a motor driven system. The actuating system is arranged to move and urge the roller 20 into engagement with the tread.

The caravan mover 10 may have an automatic actuation system. In this embodiment, a small auxiliary motor is mounted in the mounting frame 60. As the motor rotates a screw mechanism pushes/pulls the motor 16 (and head 18)/carriage 62 backwards and forwards along the frame 60.

The head 18/caravan mover 10 is moved along a translational axis which extends from the motor 16 towards the tread 14 of the wheel 12. The drive for this actuating system may be provided by the motor 16 or by another drive system such as a hydraulic or pneumatic system/piston or a manual system or an auxiliary motor.

The motor 16 may be powered by a battery (power supply) which may be mounted directly to the motor housing. Alternatively, the power may be provided by a (leisure) battery which may be mounted within or around the caravan and connected to the motor 16 through suitable cables/wires. Accordingly, each caravan mover 10 in the caravan mover system may include its own dedicated power supply which may comprise a battery mounted directly on or to the drive unit. Alternatively, one or a single/sole (or more) power supply (battery/leisure battery) may be used to distribute and/or supply power to all of the caravan movers 10 (drive units) of the caravan mover system.

The battery may comprise a 12 V battery or a 24 V battery. In particular, more powerful batteries (greater than 12 V) may be used.

As with conventional caravan movers, the operation of the caravan mover 10 may be achieved through a remote control unit 30 which communicates with a control system mounted on the caravan mover 10 or to a shared control unit mounted on or about the caravan. The caravan mover system may include a handset 30 (remote control unit) to communicate with the control unit and may use radio waves, but the preferred embodiments use Bluetooth (preferably Bluetooth 4.2). The handset may be provided by a mobile phone and, in particular, a smart phone. The smart phone may use a touch screen to replicate the functionality provided by a thumb stick.

The control unit comprises an electronic control unit (ECU) which is suitably located and is in communication with the battery and the motor(s) 16. The ECU receives a signal from an operator via the handset 30 and the ECU then selectively provides the required power to the required caravan mover 10. Generally, wires/cables extend from the battery to the ECU where they are input. The ECU has outputs which are connected to the motor(s) 16 by supply cables/wires/connectors. The ECU receives a signal from the remote control handset 30 and the signal is processed to enable the ECU to deliver the required power to the relevant motor(s) 16.

The caravan mover 10 comprises mounting means in order for the caravan mover 10 to be rigidly secured to a caravan and, in particular, to a part of the chassis 70 of a caravan.

The mounting means (mounting mechanism) comprises a static frame 60 which is fixed to the chassis 70 of the caravan. The caravan mover 10 comprises a carriage 62 which is movably mounted within the frame 60. In particular, the carriage 62 is mounted and constrained to move by slots 64 defined in the frame 60. These slots 64 direct the movement of the roller 20 (and motor 16 etc.) in a linear direction towards the tread surface 14. These slots 64 may be shaped to provide the required and preferred movement (and direction) between the disengaged position and the engaged position. The carriage 62 includes lugs 66 or securement elements which slide within these slots 64.

In the engaged position, the rollers 20 are continually urged outwardly and this may be provided by a spring mechanism.

In prior art devices, the remote control unit (handset) 40 comprises a series of discrete buttons 42, 43 on the handset 40, as shown in FIG. 4. These buttons 42, 43 may selectively enable set movements. These set movements are forward, reverse, left forward turn, right forward turn, left reverse turn and right reverse turn. Accordingly, a user must sequentially use these set movements to achieve the desired movement of the caravan. In particular, a user will press one button 42, 43 then release this button 42, 43 and press a second button 42, 43 etc. This results in a jerky movement in which a variable and gradually changing path cannot be smoothly achieved. Such caravan movers utilise brushed motors which are relatively cheap and simple compared to brushless motors. However, the disadvantage of brushed motors is the aforementioned sequential set movement pattern which results in a trade off in decreased functionality but a decreased cost for the manufacturer.

The present invention utilises a control system which provides variable movement of the or each caravan mover 10 and also provides gradual changes in both speed of each brushed motor and the subsequent ability to smoothly change the direction of travel of the caravan. In particular, the present invention enables the caravan to follow a wavy or curved line of travel in which the radius of the turn varies (i.e. from 0 degrees to a spin on the spot (equivalent to a 90 degree turn)). Accordingly, the caravan can follow sinusoidal and/or elliptical lines of travel without intermittent stops to provide sequential directional changes. Furthermore, the user has the continuous ability to simultaneously vary the speed.

In the preferred embodiment, the caravan mover system includes a number of caravan movers each being associated with a wheel. For example, a single axle caravan includes two caravan movers (one on the left hand side for the left wheel and one on the right hand side for the right wheel). Similarly, a dual axle caravan may include four caravan movers (two on the left hand side—one for front left wheel and one for rear left wheel, and two on the right hand side—one for the front right wheel and one for the rear right wheel). In the preferred embodiment, each individual caravan mover 10 includes a single (or sole) motor. Some prior art systems may utilise dual motors in each individual caravan mover which increase the cost and complexity and also introduces potential reliability problems.

As shown in FIG. 3, the preferred embodiment of the present invention comprises a handheld control device 30 (remote control (device)). The remote control 30 provides a single actuator to enable a user to control the overall direction of the caravan and also the speed of the caravan. In this preferred remote control, the actuator is in the form of a joystick or thumb stick.

The thumb stick control is operable by a single digit (i.e. thumb) of a user and is free to move around a central radial axis. The thumb stick 32 can therefore be used to control the direction of movement of the caravan through the angular position of the thumb stick 32, i.e. when the thumb stick 32 is pushed forward the caravan will move forwards; when the thumb stick 32 is moved back the caravan will reverse; when the thumb stick 32 is pushed to the left the caravan will turn to the left; and when the thumb stick 32 is pushed to the right the caravan will turn to the right. However, the thumb stick 32 enables a smooth and gradual transition in the directional movement by moving the thumb stick 32 to any intermediary position. This enables the caravan to transition from a forward movement, to a gradual right turn, to a sharp right turn etc. as the thumb stick 32 moves from a forward position to a right position. Accordingly, it will be appreciated that the thumb stick 32 enables smooth flowing movements to be controlled and performed.

Furthermore, the degree of movement of the thumb stick 32 from the origin or central position will allow the user to control the speed of movement. This provides a smooth and gradual transition of the speed from zero to a maximum when the thumb stick 32 is pushed to the outermost position.

The thumb stick 32 thereby functions as the single (sole) actuator and provides the input device for the system which control the speed of each separate brushed motor and this distribution of speed also provides unconstrained directions of movement (i.e. not predefined or pre-set angled turns). The thumb stick 32 is pivotally mounted to the remote handset 30. The thumb stick 32 comprises bias means (or urging means) to bias (urge) the thumb stick 32 to a central (neutral) position which stops power distribution to the or each brushed motor 16. This sets a default position for stopping any movement of the caravan when the actuator/thumb stick 32 is released by the user. Accordingly, if the user drops the handset 30 or is not in control of the thumb stick 32, the system provides this safety default position.

As mentioned above, the present invention provides unconstrained direction of travel for the caravan. This enables the caravan to travel freely in any direction rather than being constrained or confined to move in pre-set or pre-defined directions. The unlimited direction of travel enables the caravan to be accurately maneuvered. Prior art systems may include a number of pre-set directions, for example forward, back, left, right, forward-right, forward-left, back-right and back-left to provide 8 pre-set directions. The movement of the actuator in the present invention enables the direction of travel to be continuously varied (since it is not pre-set or constrained/restricted/limited) and the direction of travel is thereby unlimited/unconstrained/unrestricted/unconfined. Such endless direction of travel combined with a variable speed provides a user with a significant degree of control over the movement of the caravan.

In addition, the present invention provides unconstrained speed of travel for the caravan. This enables the caravan to travel freely in any speed rather than being constrained or confined to move at pre-set or pre-defined speeds. The unlimited variability of speed of travel enables the caravan to be accurately maneuvered. Prior art systems may include a number of pre-set speeds, for example normal, slow, fast. The movement of the actuator in the present invention enables the speed of travel to be continuously varied (since it is not pre-set or constrained/restricted/limited) and the (change in/variability in the) speed of travel is thereby unlimited/unconstrained/unrestricted/unconfined. Such endless variability in the speed of travel combined with a variable direction of travel provides a user with a significant degree of control over the movement of the caravan.

Figure 10A:
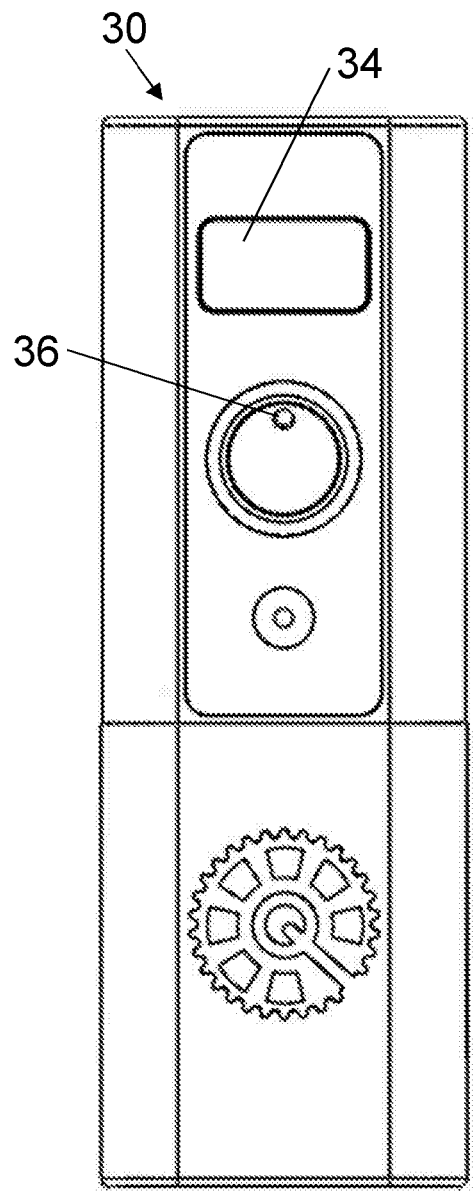
FIG. 10A and FIG. 10B are front views of another embodiment of a remote handset for a caravan mover system.
Figure 10B:
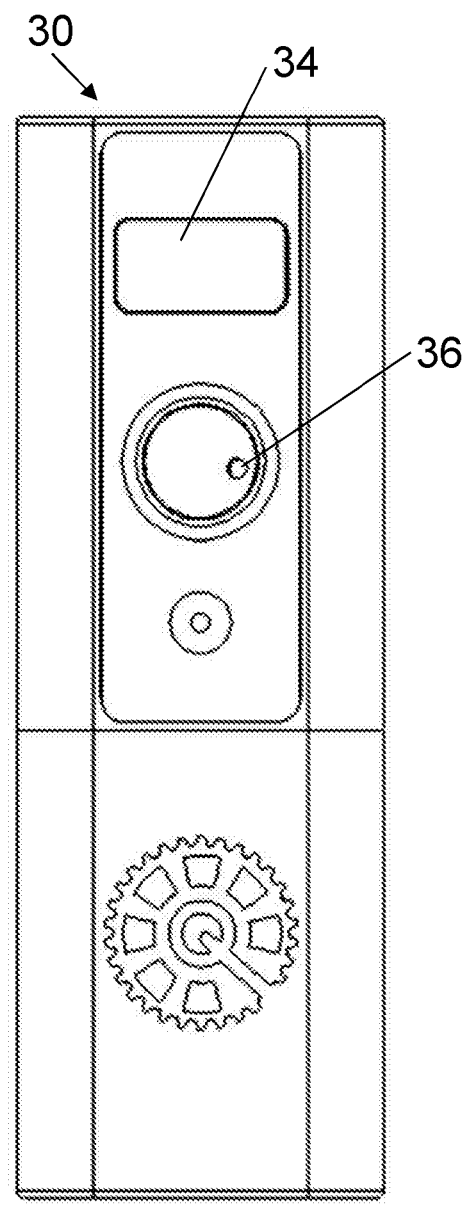

The actuator may comprise a low profile thumb stick or thumb controller, having a substantially reduced stick portion in the form of a projecting nib 36, as shown in FIGS. 10A and 10B. The nib 36 projects from a part-spherical or dome shaped base. The nib 36 is arranged to engage with a single digit (e.g. a thumb). The projecting nib 36 is arranged to deform the surface of the digit, such that the skin (or glove) forms around the nib 36. In this way, the nib 36 provides traction for the user to move the actuator. The nib 36 therefore facilitates fine control by the user, enabling accurate maneuvering of a caravan. Additionally, the small size and compact arrangement of the nib 36 reduces the risk of damage to the nib 36 and/or the control device, for example if the controller is dropped.

As mentioned above, prior art control units 40 have discrete buttons 42 which provide set movements and the user must sequentially use these to achieve the desired movement. This is a limitation of a simple prior art brushed motor caravan mover system.

As shown in FIG. 4, the left forward turn button 43 may provide 100% power to the drive unit of the right wheel and 50% power to the drive unit of the left wheel (as shown schematically in the button 43' of FIG. 5) such that the caravan moves towards the left hand side. As it will be appreciated, this arc of movement is therefore set and also the speed is set.

This distribution of power for each button 42, 43 is shown graphically and schematically in FIG. 5. For each set movement, the left hand arrow shows the power for the left wheel (or left side if there are more than one left wheels/movers) and the right hand arrow shows the power for the right wheel (or right side if there are more than one right wheel/movers). Accordingly, in the forward direction both sides (left caravan mover(s) and right caravan mover(s)) are provided with equal but set power which cannot be gradually adjusted (increased/decreased).

The present invention would provide a similar arrangement in those specific positons, i.e. the forward movement would have equal power to the left side and the right side. However, the representative height of these arrows depicting the power could be varied and changed. In particular, the height and power could be gradually (or sharply) increased and this would be done in equal proportions to both sides for a forward movement.

Figure 7:
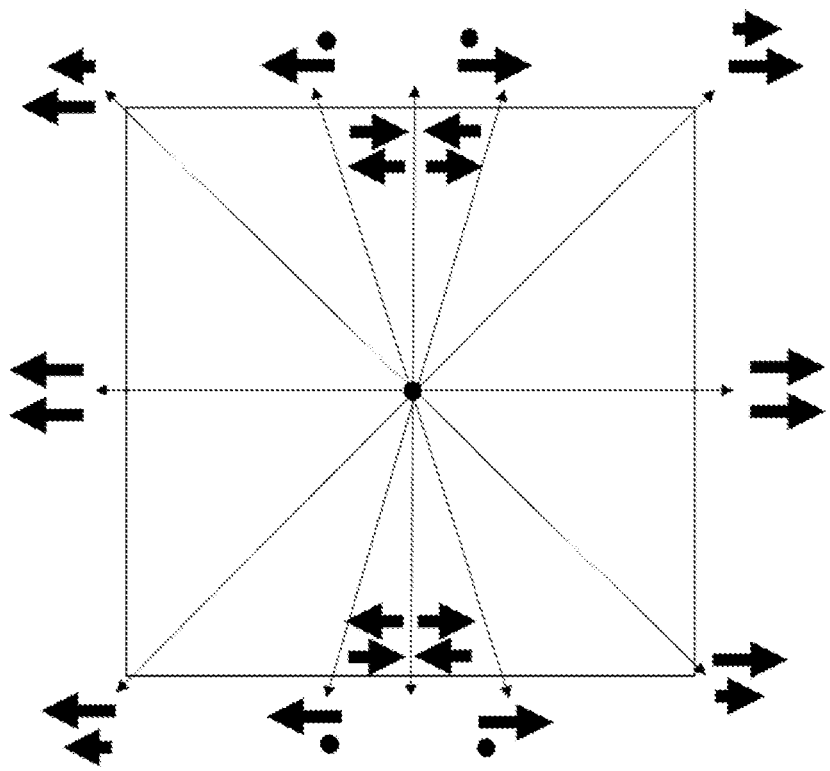
FIG. 7 is a schematic view of a preferred embodiment of a control system for a caravan mover system.
Figure 6:
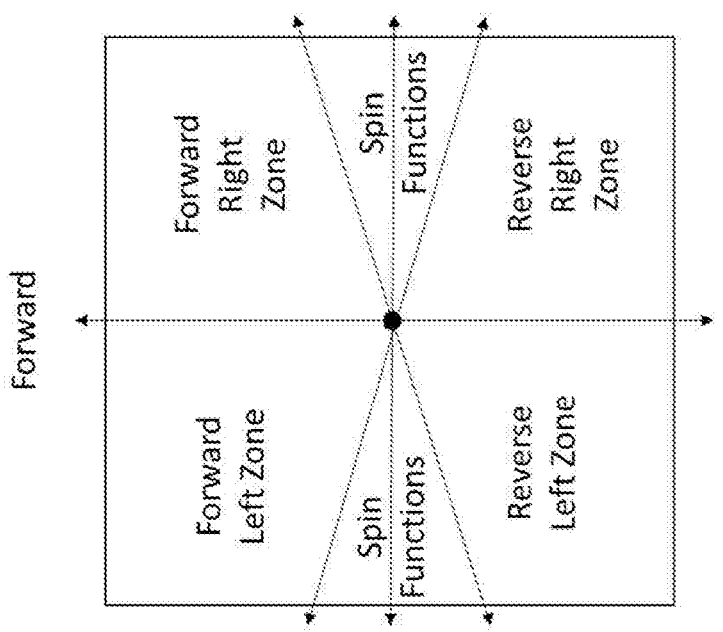
FIG. 6 is a schematic view of a preferred embodiment of a control system for a caravan mover system.

As the thumb stick 32 is rotated around towards the right, the representative height for one arrow would gradually increase whilst the representative height for the other arrow would gradually decrease, as shown schematically in FIG. 6 and FIG. 7. This gradual change in proportions of power to each side provides a smooth changing movement arc for the caravan. Overall, this significantly increases the maneuverability of the caravan by allowing an ever changing movement pattern (direction and speed).

Accordingly, in the present invention, a variable speed is achieved by controlling the voltage supplied to each (brushed) motor 16. For example, when going forward at full speed, all motors 16 are supplied the full voltage in the forward direction. When turning, the inside wheel (or the relevant/associated brushed motors 16) is supplied less voltage, this voltage goes up or down proportional to the thumb stick position, this in term effects (changes/sets/varies) the turn radius.

The flexibility and options created by this control system are further shown in FIG. 6 and FIG. 7. These two graphical representations show that the movement of the caravan can smoothly transition to provide 360 degree control from a stationary position to a maximum speed in any direction and wherein the direction is constantly adjustable. In particular, FIG. 6 and FIG. 7 shows more graphical representations of the equivalent set arrows shown in FIG. 5 including the spin function when the caravan effectively turns on a spot or about itself. In particular, the thumb stick 32 can be moved to any position shown in these graphical representations (FIG. 6 and FIG. 7) to provide any desired movement of the caravan. Furthermore, the thumb stick 32 can be moved to gradually alter and change the direction and/or speed of the caravan without releasing a set button and pressing a second set movement button.

A sequence of comparisons of the position of the thumb stick 32 and the subsequent movement pattern and speed of the caravan is shown in FIG. 9A to FIG. 9F.

The radial movement of the thumb stick 32 proportionally adjusts the distribution of power (independent per motor control). The distance from the centre point affects the overall/master speed of the system.

Essentially, the further the thumb stick 32 is moved radially the more the power distribution is adjusted (independent speed control for each side), and then the closer or further the thumb stick 32 is from the centre then this affects the overall system speed. The top half of the mapping is for forward relating commands and the bottom for reverse.

By keeping the thumb stick 32 in the same radial position, but by bringing the stick closer to the centre the same turn path can be achieved, but at a lower overall speed. Essentially the present invention operates two different types of variable speed control in one system.

In summary, the distance the thumb stick 32 is from the centre is sets the overall system speed (voltage), with the radial position adjusting the power distribution between each side of the caravan.

Accordingly, the present invention provides a brushed motor mover system with independent motor (per motor) variable speed control. As explained above, typical brushed motor control systems include directional control which typically utilises directional buttons 42, 43. Such prior art systems have a binary "on-off" control. Each button 42, 43 only has a fixed speed. Furthermore, even if the system speed can be altered, this speed is still pre-set and is not constantly adjustable, i.e. all functions operate at 25%, 50%, 100% only when selected before operation, they cannot be adjusted independently.

The present invention provides variable speed control. Depending on the thumb stick position in relation to the centre point, speed can linearly be adjusted by the user from a range of 0-100%, while simultaneously altering the direction of travel between a range of 0-360 degrees dependent on the radial position of the same thumb stick. Prior art products may offer up to 8 pre-defined directions of travel and relies on the control stick being moved into one of the predefined zones. The speed at which the mover operates may be set or predefined within the zones, and specifically the direction (rate of turning) is fixed. Accordingly, the prior art systems may comprise a binary directional button system. For example, the prior art systems may comprise a handset with 8 set directional buttons. Accordingly, it is not possible to change the direction until a different directional button is pressed (and the original directional button is released. The prior art system may include a speed control system including pre-set speeds (for example 1×, 2×, 0.5× etc.) to change the speed to predefined values. (e.g. normal or fast or slow). These prior art systems therefore only have a basic changeable speed system utilising predefined speed selections buttons, for example they may have a 1× speed button, along with a 0.5× speed button. Once selected this will affect the overall system speed but the directional operations are separate. The present invention thereby provides a system with complete speed/directional freedom which is far superior.

The present invention provides a brushed motor mover control system with independent motor variable speed. In addition, the present invention provides directional control utilising a thumb stick 32 control which allows for precision maneuvering. In the present invention, the speed is completely independent on each motor 16. The system can operate at every increment of speed from 0% to 100%. Furthermore, each motor 16 can move at different speeds, which can be changed at any time through movement of the thumb stick 32.

The handheld remote control of the present invention is shown in FIG. 3 and shows that the preferred embodiment of the remote control 30 includes a display screen 34 which may comprise an LCD. This may provide a graphical representation of the power distribution to each caravan mover 10. The screen 34 may provide a display similar to that shown schematically in FIG. 7. However, it should be appreciated that all of the arrows in FIG. 7 would not be simultaneously displayed. The display would simply graphically show the direction of the power distribution and the relative power distribution (right side: left side) through the use of a bar graph extending upwardly or downwardly from a zero axis. The display may have a bar chart for each side of the caravan to display the direction and level of movement for the left side and the right side. A directional arrow or line may also be provided which may comprise a radially extending line which can rotate around a central origin, similar to a clock face. Such a graphical representation may enable a user to determine where the level and the magnitude of power being provided and provides (or functions as) a feedback system to enable the user to increase/decrease the power within the available range and to adjust the turning arc to be more gradual or sharper. The user will be aware at all times and the display 34 will graphically show how close the current movement is to the maximum speed/sharpest turning circle and therefore enables the use to predict whether the required caravan path/movement is achievable or requires adjustment.

The present invention also provides a brushed motor mover system with compensation speed control.

Figure 8:
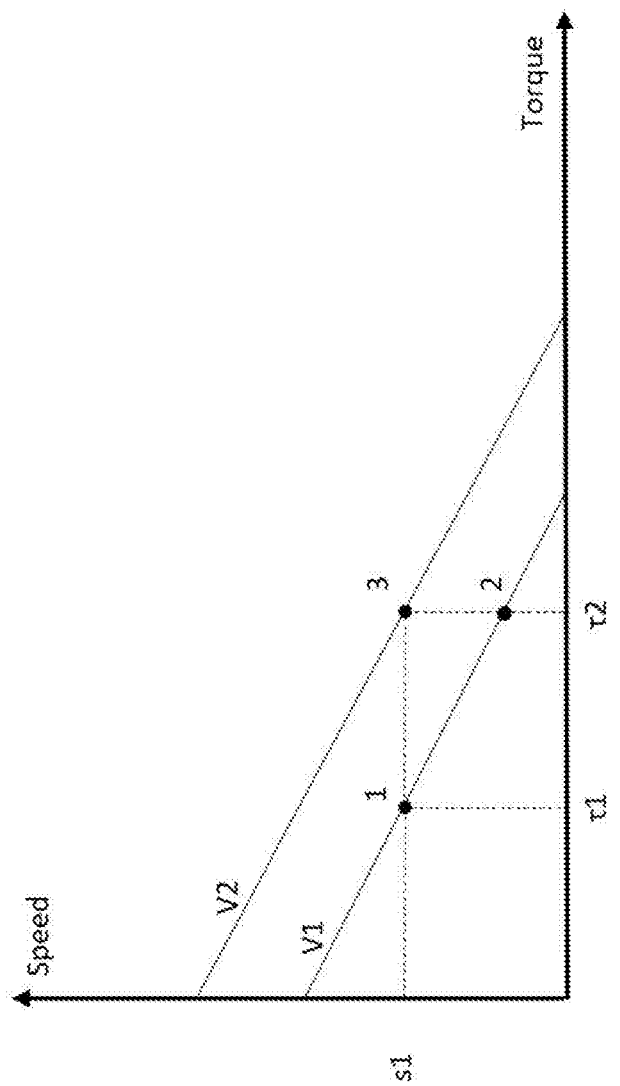
FIG. 8 is a graph representing a compensation system for a preferred embodiment of a control system for a caravan mover system.

Typically for brushed DC motors used in caravan mover applications, the operating region is normally set at the battery voltage, this is due to the simplicity of the control (which can be easily achieved by a relay). For example, for a given characteristic of a motor 16, the speed/torque curve marked as V1, where V1=battery voltage, as shown in FIG. 8. Accordingly, the motor 16 will operate along the curve V1.

At a particular load, τ1, the motor speed will run at s1, and this operating point is marked as 1 in curve V1. When a situation requires the motor running at a higher torque, τ2, the speed will follow the curve and dropped to s2. Therefore, for this change the operating point moves from 1 to 2 along the V1 line. The speed drops with the increased torque (load), this is not desired for the caravan mover 10. For example, when moving up an incline, a prior art mover will automatically slow down. In addition, if one of the caravan movers encounters an increased load then this caravan mover will automatically slow down which will thereby unnecessarily divert the direction of the caravan against the control of the user. The present invention uses a feedback and compensation system to detect this change in load/torque and this thereby adjusts the power to the required caravan mover(s) 10 to compensate for this change and to regulate the movement.

In particular, the preferred embodiment of the control system of the present invention uses a high speed semi-conductor switching device (instead of a relay) and a microprocessor. This enables the control system to control the motor voltage and effectively "shift" the characteristic curve of the motor 16. For example, the present invention can vary the motor voltage from V1 to V2 and provide a smooth transition from 1 to 3, where the motor 16 is running at the same speed with increased torque (load). The control system of the present invention provides this transition in a continuous computation using a micro-processor based on the desired speed (command) and working conditions.

The speed compensation mechanism is arranged to vary the power distributed to each motor in relation to the load detected on each motor, so as to maintain a desired motor speed under variable load. In some situations, however, a motor may be subject to a zero load, or a reverse/negative load, for example if the caravan is descending an incline or when the caravan is already moving and a reduction in speed is required. In such instances, reduction of power to a motor may not provide sufficient speed control, and a counteractive force or braking force may be required to maintain the desired speed. Accordingly, in the present invention, the control unit is arranged to independently vary a braking force of each motor to enable a gradual change of speed of each motor.

In this way, a desired speed and direction, as may be set by a user using the remote handset, can be maintained if the caravan moves over varied terrain and each motor is subject to different loads. For example, if the wheel or wheels on one side of a caravan drive are subject to a force which increases the speed of motor beyond the desired speed, such as when descending a slope, the control unit is arranged to brake the motor to control the speed of the motor. Similarly, the control unit is arranged to brake each motor in order to slow the caravan if the desired speed is reduced below a current speed of the caravan whilst the caravan is moving.

The control unit is arranged to brake each motor independently using a regenerative braking system. In the present invention, when a motor is driven by an external force such as by the inertia of a moving caravan, the control unit is arranged to use the resulting induced voltage to control the speed of the motor and optionally to return energy to the battery. In this way, the control unit is arranged to use recovered energy, which may be used immediately for braking, or stored for later use. Accordingly, the braking system provides a first, direct braking mode, in which the induced voltage is used to brake the motor, and a second, regenerative braking mode, in which the induced voltage is used to recharge the battery.

The braking system is arranged to switch between the direct braking mode and the regenerative braking mode. The braking system may also operate in both modes simultaneously, such that some of the recovered energy is used to brake the motor, and some energy is returned to the battery. Advantageously, the control unit is arranged to vary the proportions of the induced voltage which are used in the direct braking mode and regenerative braking mode. In this way, for example, the braking system may operate mostly or fully in regenerative braking mode when the battery charge level is low. If the battery charge is high, the braking system may switch to operate primarily in the direct braking mode, such that less energy is returned to the battery.

The control unit is arranged to operate the braking system in conjunction with the speed compensation mechanism in order to maintain a desired motor speed. For example, the control unit may increase power supply to one motor in response to an increased load, whilst simultaneously braking another motor to maintain a desired motor speed.

The braking system is also arranged to brake each motor by driving the motor against the direction of rotation (reverse current braking). This braking method may be reserved for situations in which a larger braking force is required, such as in emergencies.

Accordingly, embodiments of the present invention provide regenerative braking capabilities. This allows for full directional control when moving down an incline, curb or obstacle. Such a system may be beneficial in that, once the motors begin to turn and the trailer begins to roll under its own weight, previously the speed of each motor may not be adjusted and it moves in an uncontrolled fashion until the thumb stick is centred and the motors are forced to stop. From a safety and usability standpoint, this feature is very valuable. The batteries benefit from a slight recharge as the power generated from the motors is fed back into the battery.

The caravan controller may feature an energy feedback mode and back-emf (electromotive force) braking mode. When a DC motor is being turned by an external force, it generates energy and becomes a generator, this is known as re-generative mode. This regenerated energy can be fed back to the battery (energy feedback mode), or can be used to stop the motor from moving (back-emf braking mode).

This caravan controller mixes the energy feedback mode and back-emf braking mode into normal driving mode, and is able to switch in between these modes at any time, by controlling the sequence of switching devices in the controller. These modes may coexist, e.g. in 30% energy feedback mode and 70% back-emf braking mode.

Under energy feedback mode or back-emf braking mode, the motor converts external force into energy and thereby naturally posts a counter force against the external force, hence makes the motor working in "braking". The magnitude of the force is controllable by adjusting the percentage of the modes.

It should be noted that it is also possible to use the battery energy to turn the motor against the external force to make a "braking", however in practice such operation posts a huge mechanical stress to the motor and driving systems, and therefore this method only be used in emergency situations.

The use of energy feedback mode and back-emf braking mode provides a simple way to regulate the motor speed at all times and offer this controller a superb controllability when the motor is being turn by an external force, for instance when the caravan is being driven down a hill, or climbing down from a bump. The regenerated energy from the wheel normally can be fed back into the battery, or just used for braking the motor when battery charge level is close to full.

Embodiments of the present invention may use a software algorithm that allows full directional control even under a high load when traveling down an incline. This is possible through a software algorithm that allows the movers to brake independently, feeding energy back to the battery.

As mentioned above, in some embodiments, the braking force is variable and proportionally changes based on the radial position of the thumbstick. This ensures that the same degree of control is achieved regardless of the incline or speed of trailer.

The method of braking is achieved when the electronics detect a back EMF which is the electromotive force or voltage that opposes the change in current which induced it. Essentially through this feedback, the system can tell that the caravan is rolling and adapt the level of braking to suit. The power distributed to the motor(s) changes in proportion to the load detected on the associated motor(s) to achieve small speed variances in different load conditions at a particular set speed.

The invention claimed is:

1. A control system for controlling a plurality of caravan movers mounted on a caravan wherein each caravan mover comprises:
   drive means comprising a brushed motor; and
   a lateral roller wherein the lateral roller is arranged to move in an engagement direction between a first position and a second position and, in which, in the second position the lateral roller is arranged to be urged against a ground contacting surface of a wheel of the caravan in order to transmit the drive from the drive means to the wheel,
   wherein a control unit is arranged to independently vary the speed of each brushed motor to enable a gradual change of speed of each brushed motor and wherein the control unit comprises speed compensation system whereby the power supplied to each brushed motor changes in proportion to the load detected on the associated brushed motor, so as to maintain a desired motor speed under variable load.

2. A control system according to claim 1 in which the control unit provides an automatic adjustment feature to change the power supplied to each of the brushed motors in response to a detection in a change in load experienced by the respective brushed motor and wherein the speed compensation system controls the power supplied independently to each brushed motor as a function of the load detected on the associated brushed motor.

3. A control system according to claim 1 in which the control unit comprises feedback means to monitor load each brushed motor and wherein the feedback mean continuously monitors the load of each brushed motor.

4. A control system according to claim 1 in which the control unit is arranged to automatically change the power supplied to the brushed motor on detection of change of load on the brushed motor to maintain a constant motor speed in the absence of any change in manual control.

5. A control system according to claim 1 in which the speed compensation system includes a mapping function which sets the power change in response to a given change in load.

6. A control system according to claim 1 in which the control system comprises a remote handset which simultaneously controls all of the caravan movers and the remote handset comprises a single thumb stick control which controls the speed of each of the caravan movers.

7. A control system according to claim 1 in which the control system comprises a remote handset which simultaneously controls all of the caravan movers and the remote handset gradually changes the direction of travel of the caravan by gradually varying the distribution of power to the brushed motors.

8. A control system according to claim 1 in which the control system comprises a remote handset which simultaneously controls all of the caravan movers and the remote handset comprises a single actuator which controls the distribution of power to each caravan mover to gradually vary an overall movement speed of the caravan and the proportional distribution also controls a direction of movement of the caravan.

9. A control system according to claim 8 in which the single actuator comprises an input device which is pivotally mounted to the remote handset and the actuator comprises bias means to bias the actuator to a central neutral position which stops power distribution to each brushed motor and sets a default position for stopping any movement of the caravan when the actuator is released by the user.

10. A control system according to claim 8 in which the actuator enables the caravan to travel in an elliptical line of travel and the actuator enable the caravan to travel in a curved line of travel in which the radius of curvature varies.

11. A control system according to claim 1 in which the control system comprises a remote handset comprising a single manually controlled device which enables a user to gradually vary the speed of each brushed motor and vary the ratio of power provided to a left side and a right side of the caravan.

12. A control system according to claim 1 in which the control system comprises a remote handset which simultaneously controls all of the caravan movers and the remote handset comprises a display screen which provides a display to indicate the speed of each brushed motor and to indicate the direction of travel of the caravan.

13. A control system according to claim 1 in which the control unit comprises a braking system arranged to automatically change the braking of each brushed motor on detection of change of load on the brushed motor to maintain a constant motor speed in the absence of any change in manual control, wherein the braking system comprises a regenerative braking system.

14. A caravan mover comprising:
a control unit,
drive means comprising a brushed motor, and
a lateral roller wherein the lateral roller is arranged to move in an engagement direction between a first position and a second position and, in which, in the second position the lateral roller is arranged to be urged against a ground contacting surface of a wheel in order to transmit the drive from the drive means to the wheel,
wherein the control unit is arranged to vary the speed of the brushed motor and to enable a gradual change of speed of the brushed motor and wherein the control unit comprises a speed compensation system whereby the power supplied to the brushed motor changes in proportion to the load detected the brushed motor so as to maintain a desired motor speed under variable load.

15. A caravan mover according to claim 14 in which the control system comprises a remote handset comprising a single manually controlled device which enables a user to gradually vary the speed of the brushed motor and the remote handset comprises a display screen and the display screen provides a display to indicate the speed of the brushed motor.

16. A caravan mover according to claim 14 in which the control unit comprises a speed compensation system whereby the power supplied to the brushed motor changes in proportion to the load on the caravan mover.

17. A caravan mover according to claim 16 in which the speed compensation system includes a mapping function which sets the power change in response for a given change in load.

18. A caravan mover according to claim 14 in which the control unit comprises feedback means to monitor load of the brushed motor and, in which, the control unit is arranged to change the power supplied to the brushed motor on detection of change of the load on the brushed motor.

19. A method of controlling movement of a caravan comprising providing a control unit and a plurality of caravan movers secured to the caravan, wherein each caravan mover comprises:
drive means comprising a brushed motor; and
a lateral roller wherein the lateral roller is arranged to move in an engagement direction between a first position and a second position and, in which, in the second position the lateral roller is arranged to be urged against a ground contacting surface of a wheel of the caravan in order to transmit the drive from the drive means to the wheel,
and wherein method comprises using the control unit to independently vary the speed of each brushed motor to enable a gradual change of speed of each brushed motor and wherein the control unit comprises a speed compensation system whereby the power supplied to each brushed motor changes in proportion to the load detected on the associated brushed motor so as to maintain a desired motor speed under variable load.

* * * * *